United States Patent [19]

Schwanke

[11] Patent Number: 5,657,386
[45] Date of Patent: Aug. 12, 1997

[54] ELECTROMAGNETIC SHIELD FOR CELLULAR TELEPHONE

[76] Inventor: Jurgen H. Schwanke, 35 Rodeo Ave., #4, Sausalito, Calif. 94965

[21] Appl. No.: 524,036

[22] Filed: Sep. 6, 1995

[51] Int. Cl.⁶ .................................................. H04M 1/00
[52] U.S. Cl. .................... 379/433; 379/434; 379/451; 379/437; 361/814; 361/818
[58] Field of Search .................. 379/437, 451, 379/428, 433, 447; 455/89, 90, 117; 16/386, 342; 250/505.1; 361/814, 816, 818; 174/35 R, 35 GC, 35 TS

[56] References Cited

U.S. PATENT DOCUMENTS

| | | |
|---|---|---|
| 4,472,637 | 9/1984 | Sportelli et al. . |
| 4,490,616 | 12/1984 | Cipollina et al. . |
| 4,890,199 | 12/1989 | Beutler . |
| 5,090,044 | 2/1992 | Kobayashi . |
| 5,124,889 | 6/1992 | Humbert et al. . |
| 5,150,282 | 9/1992 | Tomura et al. . |
| 5,235,492 | 8/1993 | Humbert et al. . |
| 5,310,784 | 5/1994 | Ide et al. ............................ 250/505.1 |
| 5,336,896 | 8/1994 | Katz . |
| 5,398,168 | 3/1995 | Berestecky . |
| 5,400,400 | 3/1995 | Hird et al. ............................ 379/451 |

FOREIGN PATENT DOCUMENTS 2702324   9/1994   France ........................... 455/90

*Primary Examiner*—Jack K. Chiang
*Attorney, Agent, or Firm*—Flehr Hohbach Test Albritton & Herbert LLP

[57] ABSTRACT

Cellular telephone having a shield for protecting the user from electromagnetic radiation. The shield is mounted to the housing of the telephone and can be positioned between the antenna and the head of the person using the telephone to protect the person from radiation emitted by the antenna. In one presently preferred embodiment, the shield is fabricated of a plastic material having carbon fibers embedded therein for absorbing and dispersing electromagnetic radiation.

7 Claims, 2 Drawing Sheets

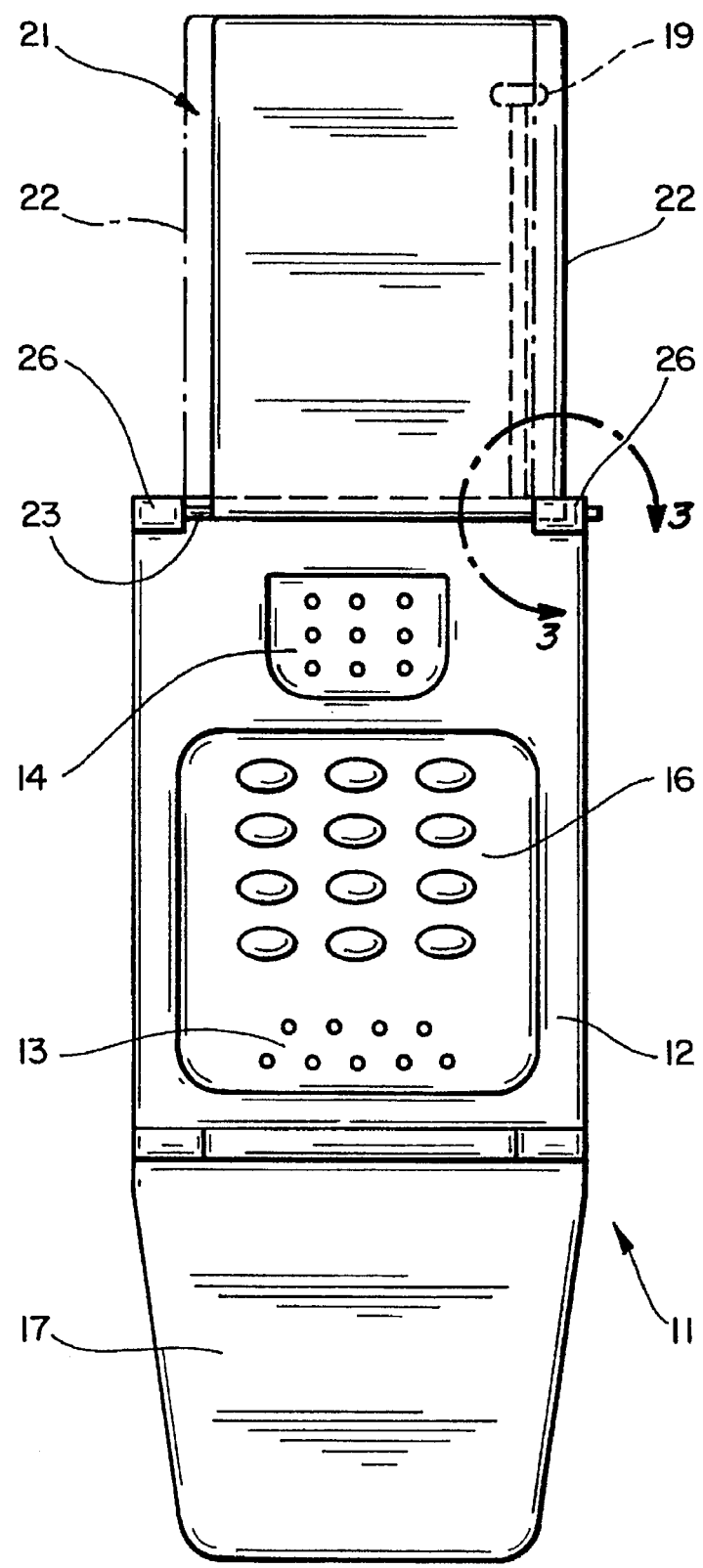
FIG_1

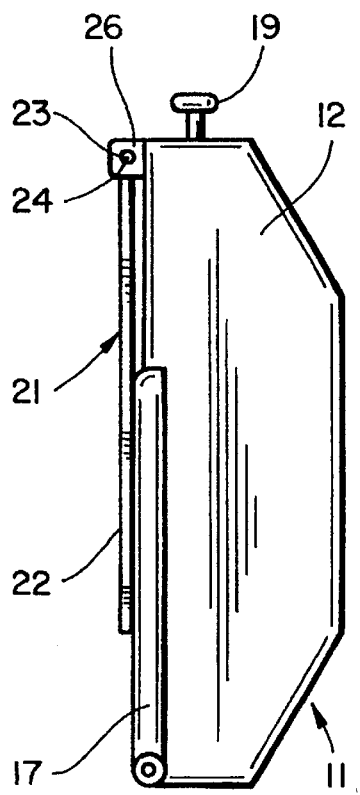
FIG_2
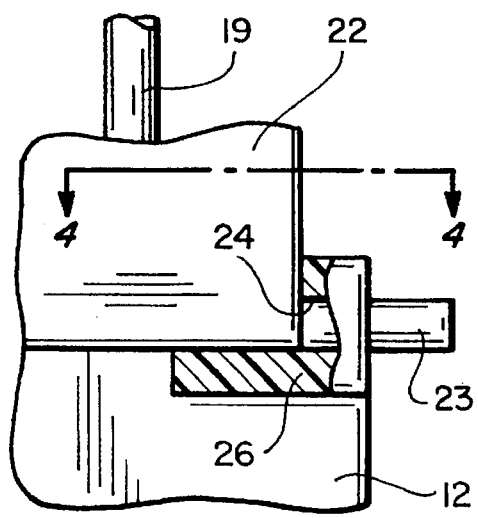
FIG_3
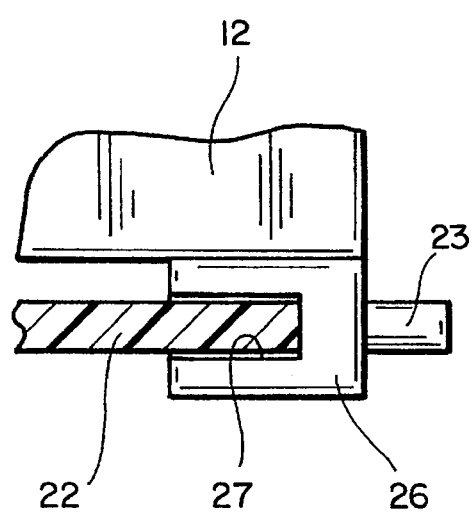
FIG_4

ELECTROMAGNETIC SHIELD FOR CELLULAR TELEPHONE

BACKGROUND OF THE INVENTION

1. Field of Invention

This invention pertains generally to cellular telephones and, more particularly, to an electromagnetic shield for protecting users of cellular telephones from harmful radiation.

2. Related Art

In recent years, as the number of hand-held cellular telephones has grown, so has the concern about tumors or other damage to the brain. Although the level of electromagnetic radiation emitted by such devices is relatively low, the antenna which emits the radiation is close to the head, and there is also concern that the radiation can have a cumulative effect.

In the past, there have been some attempts to protect the users of cellular from such radiation. However, none of those approaches has been entirely satisfactory.

U.S. Pat. No. 5,336,896, for example, shows an approach whereby the entire cellular phone, including the antenna, is placed in a shielding enclosure. The antenna is retracted and makes contact through the enclosure with a second antenna outside the enclosure. The second antenna is mounted on a tilt and swivel base so that it can be moved away from the user's head to reduce exposure to the radiation emanating from it. Even though the energy level may be reduced somewhat, the head of the user is still exposed directly to the radiation.

OBJECTS AND SUMMARY OF THE INVENTION

It is in general an object of the invention to provide a new and improved electromagnetic shield for protecting users of cellular telephones from harmful radiation.

Another object of the invention is to provide an electromagnetic shield of the above character which can be utilized with existing phones as well as with newly constructed phones.

These and other objects are achieved in accordance with the invention by providing a cellular telephone with an electromagnetic shield which can be positioned between the antenna and the head of the person using the telephone to protect the person from radiation emitted by the antenna. In one presently preferred embodiment, the shield is fabricated of a plastic material having carbon fibers embedded therein for absorbing and dispersing electromagnetic radiation.

BRIEF DESCRIPTION OF THE DRAWINGS

FIG. 1 is a front elevational view of one embodiment of a cellular telephone incorporating the invention, with the shield in an extended position.

FIG. 2 is a side elevational view of the embodiment of FIG. 1, with the shield and the antenna retracted.

FIG. 3 is an enlarged fragmentary view, partly broken away, of one of the hinges for the shield in the embodiment of FIG. 1

FIG. 4 is a cross-sectional view taken along line 4—4 in FIG. 3.

DETAILED DESCRIPTION

In the drawings FIGS. 1–4, the invention is illustrated in conjunction with a cellular telephone 11 having a body consisting of a housing 12 which contains the usual radio frequency transmitter and receiver employed in such devices. On the front side of the body are ports 13, 14 for the mouthpiece and earpiece, with a keypad 16 between them. This particular phone is a so-called "flip phone" which has a panel 17 hingedly connected to the lower portion of the body for movement between a closed position in which it serves as a protective cover for the keypad and an open position in which it helps to direct sound to the mouthpiece.

An antenna 19 extends from the upper end of the body and is connected to the transmitter and receiver for transmitting and receiving electromagnetic radiation. In the particular embodiment illustrated, the antenna is located toward the right side of the phone as viewed from the front. However, it could just as well be positioned toward the left side or toward the center of the housing.

An electromagnetic shield 21 is hingedly mounted to the upper portion of the front side of the body for movement between extended and retracted positions. In the extended position, the shield is positioned between the antenna and the head of a person using the phone and protects the person from electromagnetic radiation emanating from the antenna. In the retracted position, the shield overlies the keyboard and serves as a further protector for it.

In the embodiment illustrated, the shield comprises a generally rectangular plate 22 which is somewhat narrower in width than the body and somewhat longer than the antenna. The plate is fabricated of epoxy or another suitable plastic material having carbon fibers embedded in it for absorbing and dispersing electromagnetic radiation, and in one presently preferred embodiment, has a thickness of only ⅛ inch.

The shield plate has a pair of axially aligned pins 23 extending from opposite side edges thereof. These pins are rotatively received in sockets 24 formed in mounting lugs 26 which are affixed to the upper portion of the front side of the body. The lugs are spaced apart by a distance slightly greater than the width of the plate, and the pins serve as pivots which permit the plate to be rotated or swung between its extended and retracted positions.

With the antenna positioned toward the right side of the body, the upper portion of the mounting lug on that side is formed with an inwardly opening slot 27. This slot is slightly wider than the thickness of the shield plate, and it permits the shield to be slid to the right to better cover the antenna when the shield is in its extended position. It also serves to hold the shield plate in the extended position. In FIG. 1, the plate is shown slid to the right in full lines and in a central position in broken lines. In the central position, the edges of the plate clear both of the mounting lugs, and the plate can be pivoted about pins 23. When the plate is slid to the right and a portion of the plate is in the slot, the plate cannot pivot.

In the embodiment illustrated, the right hand edge of the shield plate is approximately in line with the right hand side of the antenna when the plate is in its central position, and there could be some exposure to direct radiation around that edge of the plate. With the plate shifted to the right, however, the antenna is fully covered by the plate, and the chances of exposure are significantly reduced.

If the antenna were positioned differently on the phone, the shield would mounted and moved accordingly in order to provide proper shielding between the antenna and the head of the user. Thus, for example, if the antenna were located toward the left side of the phone, then the left mounting lug would be slotted, and the antenna would slide toward the left to provide shield the head of the user from direct radiation from the antenna.

The mounting lugs can be affixed to the body of the phone by any suitable means. For existing phones, they can, for example, be attached adhesively, and on new phones they can be formed as an integral part of the case.

For carrying and storage, both the lower panel and the shield plate are folded over the front side of the body, as shown in FIG. 2, and serve as protective covers for the keypad and other elements on the front, as well as reducing the overall dimensions of the phone. In use, both the lower panel and the shield plate are folded out, and the shield plate is slid to the side in front of the antenna. When the phone is held up to the head of the person using the phone, the shield is positioned between the antenna and the head, and the carbon fibers in the shield absorb and disperse electromagnetic radiation directed toward the head and protect the user from that radiation.

The invention has a number of important features and advantages. Since the carbon fiber absorbs and disperses the radiated energy, grounding of the shield is not necessary. Positioning the shield between the antenna and the head does not affect the functionality or range of the phone, and measurements have shown that the shield reduces the amount of energy striking the head from the antenna by about 70 percent. The ability to move the shield in front of the antenna provides greater shielding than might otherwise be provided when the antenna is located near the side of the phone.

It is apparent from the foregoing that a new and improved shield for cellular telephones has been provided. While only one presently preferred embodiment has been described in detail, as will be apparent to those familiar with the art, certain changes and modifications can be made without departing from the scope of the invention as defined by the following claims.

I claim:

1. In a cellular telephone: a housing containing a radio transmitter adapted to be held to the head of a person using the telephone, an antenna connected to the transmitter and extending from one end of the housing for emitting electromagnetic radiation, a shield fabricated of a plastic material having carbon fibers embedded therein for absorbing and dispersing the electromagnetic radiation, and a hinge mounting the shield to the housing toward the one end for movement about an axis perpendicular to the antenna between a position adjacent to the housing and a position adjacent to the antenna for protecting the person from the radiation emitted by the antenna, the hinge permitting movement of the shield along the axis so that the shield can be positioned directly between the antenna and the head of the person using the telephone.

2. In a cellular telephone: a housing containing a radio transmitter, an antenna connected to the transmitter and extending from one end of the housing for emitting electromagnetic radiation, an earpiece port on one side of the housing near the antenna, a shield for blocking the electromagnetic radiation, and means mounting the shield to the housing between the earpiece port and the antenna for rotational movement about an axis and translational movement along the axis between a position adjacent to the side of the housing and a position adjacent to the antenna.

3. The cellular telephone of claim 2 wherein the shield is fabricated of a plastic material having carbon fibers embedded therein for absorbing and dispersing the electromagnetic radiation.

4. The cellular telephone of claim 2 wherein the means mounting the shield to the housing comprises an axially extending pivot pin which extends from an edge of the shield, a mount receiving the pivot pin, the mount being affixed to the housing so that the shield can rotate about the axis of the pin between extended and retracted positions relative to the antenna and housing, and an axially extending slot formed in the mount for receiving an edge portion of the shield when the shield is in the extended position and is moved along the axis toward the mount with the slot.

5. The cellular telephone of claim 4 wherein the pin is affixed to the shield and is rotatively and slidably received in the mount.

6. In a cellular telephone: a housing containing a radio transmitter, an antenna connected to the transmitter and extending from one end of the housing for emitting electromagnetic radiation, a shield for blocking the electromagnetic radiation, a pair of axially aligned pivot pins extending from opposite side edges of the shield, a pair of mounts affixed to the housing adjacent to the side edges of the shield and rotatively receiving the pins so that the shield can swing between extended and retracted positions relative to the antenna and housing, and an axially extending slot formed in one of the mounts for receiving an edge portion of the shield when the shield is in the extended position and is moved along the axis toward the mount with the slot.

7. The cellular telephone of claim 6 wherein the shield is fabricated of a plastic material having carbon fibers embedded therein for absorbing and dispersing the electromagnetic radiation.

* * * * *